Sept. 29, 1931. W. J. CARR 1,825,577
BRAKE CONTROL FOR AIRCRAFT LANDING WHEELS
Original Filed Oct. 13, 1928
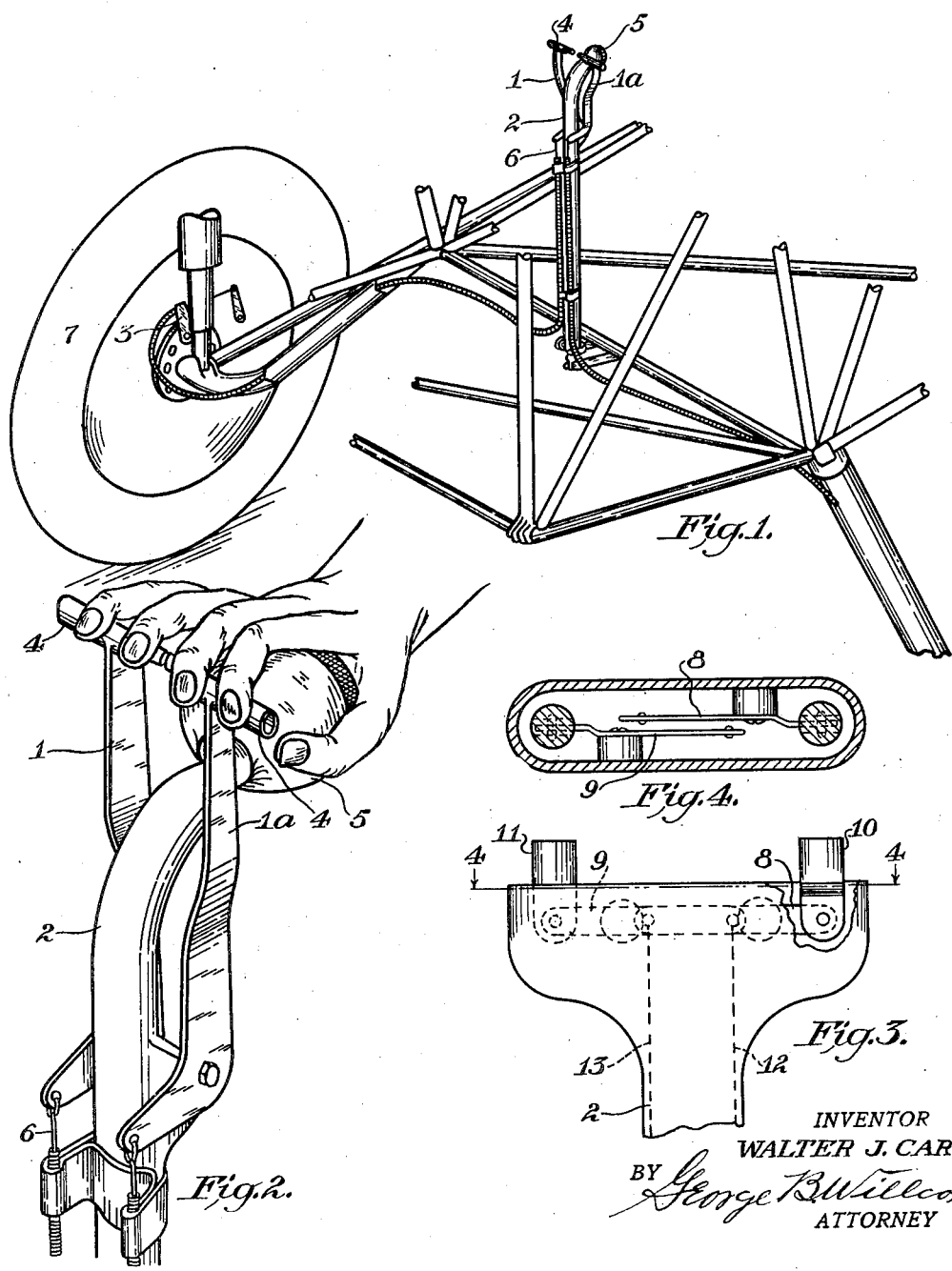
INVENTOR
WALTER J. CARR
BY George B. Willcox
ATTORNEY Patented Sept. 29, 1931

1,825,577

UNITED STATES PATENT OFFICE

WALTER J. CARR, OF SAGINAW, MICHIGAN, ASSIGNOR, BY MESNE ASSIGNMENTS, OF ONE-HALF TO PARAMOUNT AIRCRAFT CORPORATION, A CORPORATION OF MICHIGAN, AND ONE-HALF TO GEORGE C. WILLCOX, OF SAGINAW, MICHIGAN

BRAKE CONTROL FOR AIRCRAFT LANDING WHEELS

Application filed October 13, 1928, Serial No. 312,253. Renewed February 9, 1931.

My invention relates to an improved mechanism for actuating the wheel brakes of aircraft. Heretofore the levers that control the wheel brakes have been mounted in such a position that their operation required the use of the pilot's free hand, the other hand being occupied with operating the control stick of the aircraft. In addition to that, it is necessary while landing an aeroplane or maneuvering a plane on the ground to be able to quickly regulate the engine throttle and one hand of the pilot should be free for that purpose.

In order to simplify the pilot's task the wheel brake controls have heretofore been foot-operated, but since most aircraft have their rudder surfaces controlled by foot pedals this expedient is also awkward, especially when a change in the rudder setting and simultaneous application of brakes to one or both wheels becomes necessary.

The invention consists in a novel means for either simultaneously or separately controlling the individual wheel brakes of an aircraft, the separate controls being so mounted as to be operable by the pilot's hand which is engaged in controlling the horizontal and lateral balance of the plane and without interfering with the performance of that duty. The pilot's other hand is thus kept free for the performance of other tasks, such as controlling the motor throttle.

In the drawings Fig. 1 is a fragmentary view in perspective of the landing gear and control stick of an aeroplane embodying my improvement.

Fig. 2 is an enlarged view of the upper part of the control stick with my invention in a preferred form mounted thereon.

Fig. 3 is a side view of a modified form of the invention.

Fig. 4 is a cross sectional view on the line 4—4 of Fig. 3.

As is shown in Figs. 1 and 2, the preferred embodiment of my invention consists of levers 1, 1a mounted at the top of the aeroplane control lever 2, there being one lever for each wheel brake 3. A finger piece 4 on each lever 1 can be grasped by one or two fingers of the piloting hand without removing from its operating position on the control handle 5.

When a finger piece, as 4, is pulled, an intermediate bellcrank 1 pivoted on the control stick pulls a cable 6 to operate the brake mechanism 3 of the corresponding wheel 7.

The scope of my invention is not limited to the precise arrangement of levers disclosed here, but it may as claimed embody various elements in combination for accomplishing the same purpose. For example, in Figs. 3 and 4 the control handle 5 is formed as a container within which is pivoted the system of brake-control levers 8, 9, that connect the finger pieces 10, 11 to the respective cables 12, 13.

Likewise, any other suitable brake-actuating devices may be employed without departing from my invention as claimed, for example, the well-known hydraulic, pneumatic or electrically operated brakes now in common use, it being only essential that the brake-actuating finger pieces be carried by the control stick in such position that the hand that manipulates the stick can also reach and operate either or both of the brake mechanisms, at will, and preferably without changing the position of the hand on the control lever grip.

While using this device the pilot has full control of aileron and elevator at all times and also has full and independent control of the brakes on the individual wheels and can manipulate the plane on the ground in any direction and turn it about on a very short radius. The use of the brake device in no way modifies or affects the normal functioning of the aileron control lever.

Having thus described my invention, what I claim and desire to secure by Letters Patent is:

In combination, a control stick and two independently operable brake-actuating elements carried by said control stick in such relation to the handle thereof that the pilot's hand while normally positioned on said handle can, without removal therefrom and simultaneously with the operation of the control stick or independently thereof, operate either of said brake-actuating elements independently or both together, for the purposes set forth.

In testimony whereof, I affix my signature.

WALTER J. CARR.